United States Patent [19]

Cha

[11] Patent Number: 5,256,265

[45] Date of Patent: Oct. 26, 1993

[54] PROCESS FOR OXIDE REACTIONS BY RADIOFREQUENCY-CHAR CATALYSIS

[76] Inventor: Chang Y. Cha, 3807 Reynolds St., Laramie, Wyo. 82070

[21] Appl. No.: 975,038

[22] Filed: Nov. 12, 1992

Related U.S. Application Data

[63] Continuation-in-part of Ser. No. 895,962, Jun. 9, 1992, which is a continuation-in-part of Ser. No. 670,842, Mar. 18, 1991.

[51] Int. Cl.$^5$ ............................................. B01D 53/00
[52] U.S. Cl. ............................ 204/157.3; 204/157.43; 204/157.6; 204/158.2
[58] Field of Search ........... 204/157.3, 157.15, 157.43, 204/157.46, 157.49

[56] References Cited

U.S. PATENT DOCUMENTS

| | | | |
|---|---|---|---|
| 3,502,427 | 3/1970 | Johswich | 23/2 |
| 3,565,777 | 2/1971 | Lauer | 204/157.1 |
| 3,656,441 | 4/1972 | Grey et al. | 110/8 R |
| 3,765,153 | 10/1973 | Grey | 55/118 |
| 3,869,362 | 3/1975 | Machi et al. | 204/157.1 R |
| 3,887,683 | 6/1975 | Abe et al. | 423/235 |
| 3,960,682 | 6/1976 | Baranova et al. | 204/157.1 H |
| 3,981,815 | 9/1976 | Taniguchi et al. | 252/182 |
| 3,997,415 | 12/1976 | Machi et al. | 204/157.1 H |
| 4,004,995 | 1/1977 | Machi et al. | 204/157.1 H |
| 4,076,606 | 2/1978 | Suzuki et al. | 204/157.1 R |
| 4,076,607 | 2/1978 | Zavitsanos et al. | 204/162 R |
| 4,175,016 | 11/1979 | Lewis et al. | 204/157.1 H |
| 4,435,374 | 3/1984 | Helm | 423/415 A |
| 4,940,405 | 7/1990 | Kelly | 431/1 |

OTHER PUBLICATIONS

Kirk-Othmer, Encyclopedia of Chemical Technology, 3rd Ed. vol. 15, 494–517, (Microwave Technology).
E. Wall et al, "Retorting Oil Shale by Microwave Power", Advances in Chemistry, vol. 183, 329–341, 1979.
N. Cook, Microwave Principles and Systems, Prentice-Hall, 1986.

*Primary Examiner*—John Niebling
*Assistant Examiner*—Cybille Delacroix-Muirheid
*Attorney, Agent, or Firm*—John O. Mingle

[57] ABSTRACT

This process for oxide reactions by radiofrequency—char catalysis utilizes the unique chemical reactivity of an RF-energized char surface to enhance desirable chemical reactions involving oxides. Decomposition of selected oxide constituents from a gas stream is a typical application.

11 Claims, 1 Drawing Sheet

PROCESS FOR OXIDE REACTIONS BY RADIOFREQUENCY-CHAR CATALYSIS

This application is a continuation-in-part of application Ser. No. 07/895,962, filed Jun. 09, 1992, whose specification is hereby incorporated by reference, which itself was a continuation-in-part of application Ser. No. 07/670,842, filed Mar. 18, 1991, whose specification is hereby incorporated by reference.

BACKGROUND OF INVENTION

1. Field of Invention

The present invention relates to a process for using electromagnetic energy in the radiofrequency region to catalyze with char to perform selective chemical reactions involving oxides.

2. Background

Many major industrial operations produce selected gases, often in the form of polar molecules or molecules that absorb readily upon char, that need cleanup or conversion to more environmentally mundane materials. Conventional chemical processing requires much energy, since the heats of reaction are often high.

Coal is a major energy resource of the United States and must be utilized in increased amounts if energy independence is potentially a viable goal. A major problem associated with coal combustion is the resulting emissions of sulfur dioxide ($SO_2$) and nitrogen oxides ($NO_x$) into the atmosphere. Current flue gas removal technologies are not only expensive and cumbersome, but also produce troublesome waste products. High volumes of chemicals currently are required for $SO_2$ removal while $NO_x$ removal often uses expensive platinum catalysts. High conversions remain a difficult goal for these current technologies for the convenient chemical reactions require high activation energies, and thus, normally high temperatures.

Current converters to further react CO, $NO_x$, and soot from vehicle exhausts is expensive and often inefficient. Many industrial chemical operations produce $H_2S$ and this must be reacted into other forms before any release to the environment.

Quantum radiofrequency (RF) physics is based upon the phenomenon of resonant interaction with matter of electromagnetic radiation in the microwave, RF regions since every atom or molecule can absorb, and thus radiate, electromagnetic waves of various wavelengths. The detection of the radiated spectrum to determine the energy levels of the specific atoms or molecules is called radiofrequency spectroscopy. Often the so called "fine lines" are of interest, and these are created by the rotational and vibrational modes of the electrons. For instance, refer to L. Stepin, *Quantum Radio Frequency Physics*, MIT Press, 1965.

In the subject invention, the inverse is of interest, that is the absorption of microwave, RF wavelengths by the energy bands of the atoms or molecules resulting in a heating of the nonplasma material and the excitation of valence electrons. This lowers the activation energy required for desirable chemical reactions. In this sense, RF energy itself is often described as a type of catalysis when applied to chemical reaction rates. For instance, refer to Kirk-Othmer, *Encyclopedia of Chemical Technology*, 3rd Edition, Volume 15, pages 494–517, Microwave Technology.

The electromagnetic frequency spectrum is conveniently divided into ultrasonic, microwave, and optical regions. The microwave region runs from 300 MHz (megahertz) to 300 Ghz (gigahertz) and encompasses frequencies used for much communication equipment. For instance, refer to N. Cook, *Microwave Principles and Systems*, Prentice-Hall, 1986. A narrow part of this microwave region, 915 to 5000 MHz, is commonly employed for selective heating purposes. Microwave ovens are a common household item and operate normally using 2450 MHz, which is a good frequency for exciting water molecules. Because many vibrational energies are involved from a series of molecules for many applications involving mixtures, the actual radiofrequency energy employed is not critical from a frequency viewpoint; thus, the total practical range of from 915 to 5000 MHz is equally effective in catalyzing chemical reactions of mixtures. For instance, refer to Kirk-Othmer, *Encyclopedia of Chemical Technology*, 3rd Edition, Volume 15, pages 494–517, Microwave Technology.

Some authors refer to "tuning" to one directed frequency for a given molecular bond response. Yet a more practical situation for mixtures nothing prevents the RF frequency from changing in a given manner, such as continuously over a range or in time steps. In most circumstances where a mixture of molecules is present sufficient excitation can be obtained by any set frequency in the normal range of 915 to 5000 MHz sometimes by increasing the power.

Because of cost many commercial as well as industrial microwave heating units operate at 2450 MHz, and this frequency is normally employed; however, as scale-up of equipment occurs, wave guide design often makes it more efficient to shift to the 915 MHz frequency.

This type of microwave heating often goes by the common name "RF Heating" and is actually a misnomer for most actual radiofrequencies lie in the what is now called the ultrasonic region. This concept of using the symbol RF to indicate a catalytic heating action for chemical reactions, regardless of the actual frequencies employed, is common.

Much energy related research was performed in the decade of the 1970s, and a number of United States patents were issued. These and others include:

| No. | Inventor | Year |
| --- | --- | --- |
| 3,502,427 | Johswich | 1970 |
| 3,565,777 | Lauer | 1971 |
| 3,656,441 | Grey-1 | 1972 |
| 3,765,153 | Grey-2 | 1973 |
| 3,869,362 | Machi-1 | 1975 |
| 3,887,683 | Abe | 1975 |
| 3,960,682 | Baranova | 1976 |
| 3,981,815 | Taniguchi | 1976 |
| 3,997,415 | Machi-2 | 1976 |
| 4,004,995 | Machi-3 | 1977 |
| 4,076,606 | Suzuki | 1978 |
| 4,076,607 | Zavitsanos | 1978 |
| 4,175,016 | Lewis | 1979 |
| 4,435,374 | Helm | 1984 |
| 4,940,405 | Kelley | 1990 |

Referring to the above list, Johswich discloses an acid treated activated carbon, giving a higher porosity, for use in removing sulfur, sulfur oxides and nitrogen oxides from flue gases. Lauer discloses a process to decompose sulfur dioxide by first electrically charging water used for absorption and then exposing to an ultraviolet light catalyst to enhance sulfur formation. Grey-1 discloses a cyclone wall-film wash for flue gas components that is enhanced by an electrostatic corona discharge. Grey-2 discloses equipment for an electrostatic ionizing process within a cyclone system that removes flue gas components.

Machi-1 discloses a process for removing $SO_2$ and $NO_x$ by employing ionizing radiation or ultraviolet light at specific compositions to enhance their decomposition. Abe discloses a process for the removal of nitrogen oxides by injecting ammonia and absorbing on activated charcoal with a vanadium oxide catalyst. Baranova discloses a process for handling waste gas containing sulphurous-acid anhydride using an inorganic manganese salt as catalyst. Taniguchi discloses a process for removing sulfur dioxide and nitrogen dioxides by using ionizing radiation to form a removable aerosol.

Machi-2 discloses an improvement over Machi-1 by employing contaminated air as part of the process. Machi-3 discloses an improvement over Machi-1 by employing high dose rate electron beam irradiation. Suzuki discloses a process for decomposing $NO_x$ using microwave irradiation in the presence of normal exhaust gas constituents, such as $SO_2$, $CO_2$, in a typical homogenous decomposition.

Zavitsanos discloses a process for partially removing sulfur from coal by in-situ reactions using standard microwaves. Lewis discloses a radiolytic-chemical process for gas production employing nitrogen oxides to inhibit secondary reactions.

Helm discloses a high temperature process employing superheated steam with carbon and microwave irradiation to produce water gas. Kelley discloses a two stage furnace pulsed combustor where the first combustor forms soot that is employed to reduce $SO_2$ and $NO_x$ in the second combustor where calcium is added to react with the sulfur.

Microwave heating was employed in other activities. For instance, Wall et al retorted oil shale with a standard microwave source in "Retorting Oil Shale by Microwave Power," 183 Advances in Chemistry Series 329, American Chemical Society, 1979.

SUMMARY OF INVENTION

The present invention utilizes RF—char catalysis to react oxide gases primarily producing conversion chemical reactions. Some common reactions involve, among others, $NO_x$, $SO_2$, $N_2O$, $H_2S$, $O_2$, CO and soot carbon.

The objectives of the present invention include overcoming the above-mentioned deficiencies in the prior art and providing a potentially economically viable process for catalyzing RF—char chemical reactions.

DETAILED DESCRIPTION OF INVENTION

Figure 1:
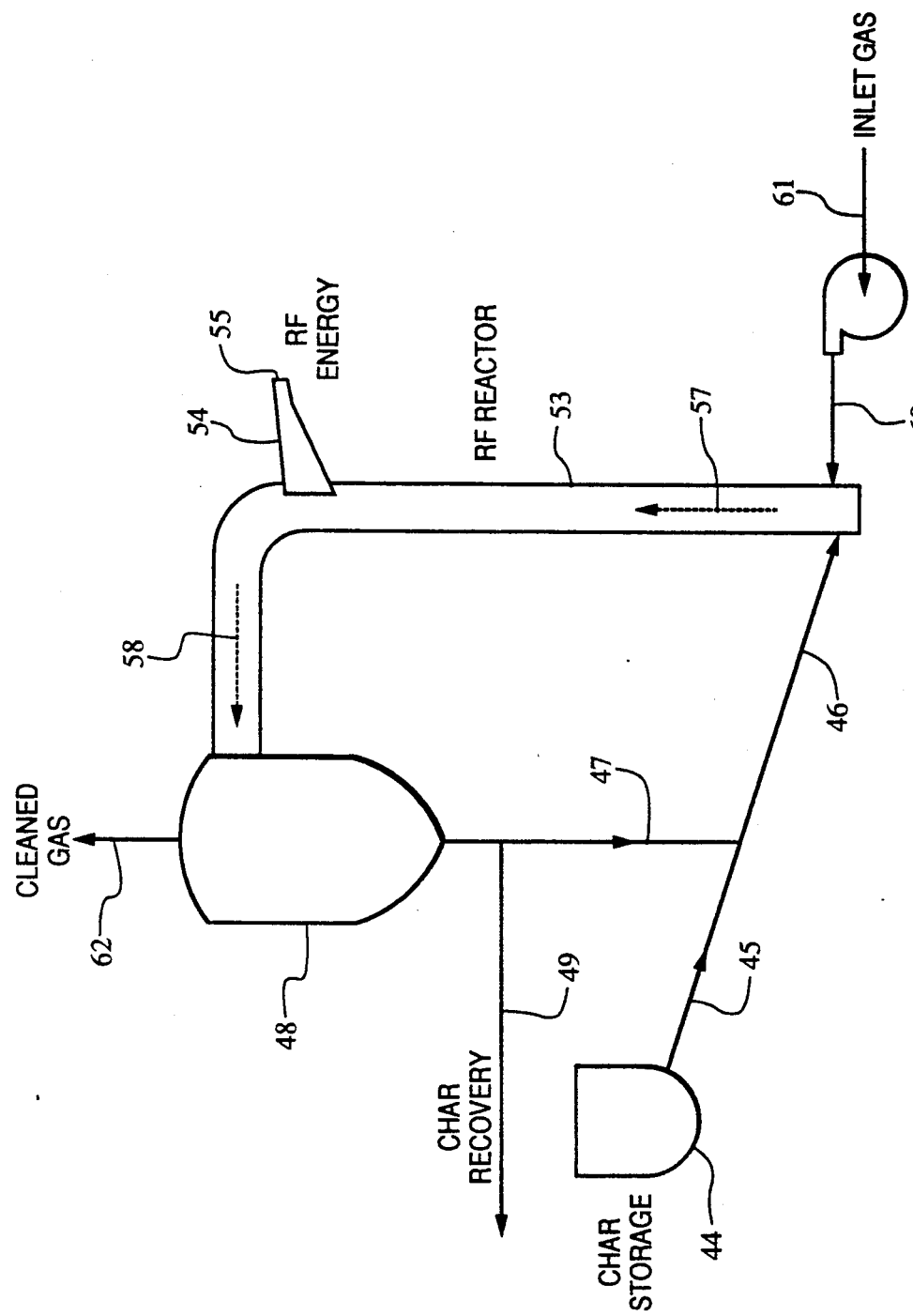
FIG. 1 shows a typical flow diagram for RF—char catalyzed chemical reactions.

Radiofrequency (RF) heating is a versatile form of energy that is applicable to enhance rates of chemical reactions and therefore serves as a chemical catalyst. Particularly reactions that proceed by free-radical mechanisms are often catalyzed to higher rates because their initial equilibrium thermodynamics is unfavorable. A second class of catalyzed reactions are those whose reaction kinetics appear unfavorable at desirable temperature conditions.

Char is an impure carbon product where the impurities are generally of a polar molecular nature that enhances RF energy absorption. The more general term is pyrolytic carbon. Further it has good properties for the reaction of many oxide gases, like $NO_x$, $SO_2$, $N_2O$, $O_2$, and CO, by providing a large heterogeneous surface for the reaction as well as a source of carbon. When char, which contains a high percentage of carbon as shown in Table 1, is placed in a RF microwave field, its local surface temperature rapidly increase setting up a large temperature gradient between said surface and the surrounding bulk gas phase. If this gas phase comprises general polar-containing molecules, such molecules will likely decompose on the surface and often additionally react with surface carbon. In particular such RF—char reactions highly favor oxide conversion from a parent molecule. Because the RF energy has heated the char surface, the combination acts as a catalyst for these heterogenous reactions to proceed with a relatively low bulk gas temperature of generally below approximately 300° F.

If the gas stream contains entrained soot, which is largely carbon with impurities, it acts similar to char. However such soot needs to be adsorbed on the char surface or be present in relatively large sized particles so that rapid cooling by the gas stream is avoided. Further such soot easily reacts with any oxide present, including $O_2$.

Gases containing $NO_x$, $SO_2$, $H_2S$, $N_2O$ and $O_2$ contact the RF energized carbon from char, carbon black, soot or other elemental carbon containing substance, the following chemical reactions potentially proceed:

TABLE 1

| Elemental Composition of Char | |
|---|---|
| Component | Weight % |
| Carbon | 77.1 |
| Hydrogen | 2.3 |
| Nitrogen | 1.2 |
| Sulfur | 0.4 |
| Oxygen | 10.1 |
| Ash | 8.9 |

TABLE 2

| Composition of Gas Produced from Char | |
|---|---|
| Component | volume % |
| $H_2$ | 59.2 |
| CO | 35.0 |
| $CH_4$ | 1.6 |
| $CO_2$ | 4.2 |

TABLE 3

| Composition of Gas Produced From $H_2S$-Char Reaction | | | | | |
|---|---|---|---|---|---|
| Time | Volume % on dry basis | | | | |
| min | $H_2S$ | $H_2$ | CO | $CO_2$ | $N_2$ |
| 30 | 0.00 | 8.45 | 2.16 | 2.08 | 87.32 |
| 60 | 0.00 | 8.12 | 2.07 | 1.06 | 88.76 |
| 90 | 0.00 | 10.26 | 1.42 | 0.46 | 87.86 |
| 120 | 0.52 | 4.47 | 0.68 | 0.30 | 94.01 |
| 150 | 1.66 | 3.36 | 0.43 | 0.20 | 94.36 |

$$C + 2NO \text{---(RF)} \rightarrow CO_2 + N_2; \tag{1}$$

$$C + NO \text{---(RF)} \rightarrow CO + \tfrac{1}{2}N_2; \tag{2}$$

$$C + SO_2 \text{---(RF)} \rightarrow CO_2 + S; \tag{3}$$

$$2C + SO_2 \text{---(RF)} \rightarrow 2CO + S; \tag{4}$$

$$C + N_2O \xrightarrow{(RF)} CO + N_2; \quad (5)$$

$$C + 2N_2O \xrightarrow{(RF)} CO_2 + 2N_2; \quad (6)$$

$$C + 2H_2S \xrightarrow{(RF)} CH_4 + 2S; \quad (7)$$

where —(RF)→ implies that RF microwave energy catalyzes the reaction on the char surface to proceed in the direction indicated. Reactions (1), (3), (5) and (6) are exothermic and are favored at low temperatures. Reactions (2) and (4) are endothermic and occur without catalysis only at elevated temperatures.

Reaction (7) normally does not occur since some form of oxide is often present either in the gas or the char; thus, the products are usually hydrogen and sulfur dioxide, which then further reacts according to reactions (3) and (4) giving sulfur, carbon dioxide, and carbon monoxide. If excess oxygen is present and carbon or char is limited, then water forms.

As noted in reactions (3), (4), and (7) sulfur is the reaction product and not sulfuric acid. Yet because of the oxygen and water in the gas stream, such as is found in gas exhausts, the actual reaction mechanism is likely more complicated but the above reactions well describe the overall result which is a general conversion of such gas molecules.

As shown in Table 1, virgin char contains a number of constituents beside carbon, and the RF microwave energy does decompose it. Typical components are:

$$Char \xrightarrow{(RF)} H_2 + CO + C + Ash; \quad (8)$$

where this occurs even at the low bulk gas temperatures. The nitrogen is not included herein since it often is employed as a sweep gas for such a reaction. Table 2 gives a typical gas analysis obtained by heating virgin char with RF energy, and shows some methane formation.

In a practical sense, the char is often present much in excess and is largely recycled after any adsorbed components are removed by further processing. Recycling char gradually removes its impurities as shown in reaction (8) and in so doing increases its pore volume and surface area leaving largely activated carbon.

FIG. 1 shows the flow sheet of a system practicing the subject invention when applied to cleaning up a gas containing numerous oxides. Char 44 is stored and is enters as makeup 45 into the RF reactor 53. Additionally recirculated char also enters 47 although some is removed for char recovery 49 to eliminate ash and deposited sulfur. Any source of pyrolytic carbon containing a large surface area is potentially useable in place of char, for instance, mild gasification of coal produces such a material. Further mixtures of char and coal are potentially employable.

The gas containing oxides 61, such as $SO_2$, $NO_x$, or $N_2O$, is pressured adequately 60 and enters the RF reactor 53 and gives a moving or entrained bed reactor 57 as the gas and char flow together. Alternately fluidized beds or alternating fixed beds are feasible. The RF energy 55 is directed into the reactor through wave guides 54, and for industrial units the physical reactor size is normally adequate to absorb the RF energy by multiple reflections into the moving bed 57. The RF energy 55 catalyzes the appropriate oxide reactions with char producing elemental substances and oxides of carbon.

The moving or entrained bed 58 then leaves the reactor 53 and enters a cyclone 48 or other gas-solid separator. Alternatively the bed may be a fluidized bed with appropriate inlet and outlet solids provisions. The cleaned gas 62 is exhausted while the char 47 is removed at the bottom of the cyclone 48 and is either recycled 46 or sent to the char recovery 49. The residence time of the char and the amount of RF energy generally govern the reaction rates.

EXAMPLE 1

To preliminary investigate the performance of the subject invention in carrying out reactions (1)-(8) a laboratory system was employed. A RF energy source at the standard microwave frequency of 2450 MHz and reasonable power was used with a special wave guide constructed to surround the reaction tube of $\frac{1}{4}$ to $\frac{3}{4}$ I.D. Vycor, a material that was essentially transparent to microwave energy or RF-insulating. RF connections were made through mitre plates that allow needed access.

Load impedance matching was available and was often used with laboratory systems since the reaction chamber was physically small. In most industrial applications the reaction chamber and wave guides were large and reflected microwaves became eventually absorbed by the moving bed of char; thus, load impedance matching became unnecessary.

A co-pending application, U.S. patent application Ser. No. 07/828,380, entitled "Process for Activated Carbon Regeneration by Radiofrequency Catalysis", hereinafter app. '380, well described this test experimental apparatus and the specification of said application is hereby incorporated by reference. Further the parent application, Ser. No. 07/845,962, previously incorporated by reference, described the modified version of the RF-wave guide reactor system.

Table 1 gave a typical composition of char obtained from mild gasification of subbituminous Western coal. Char from other sources would expect to possess a somewhat different composition, but behave in the subject invention in a similar expected manner. Applying RF-energy to the char alone at approximately 400° F. using a nitrogen carrier gas produced a gas composition as shown in Table 2.

The sulfur ends up adsorbed on the char and was not released at this reaction temperature. The char can adsorb from approximately 5.9 to 10.1 weight percent $SO_2$ depending upon whether it was RF pre-treated; however, the catalyzed reaction by RF—char proceeds well whether or not the gases became preadsorbed onto the char or not.

Adsorption of NO was not as great as $SO_2$, but the actual form of the $NO_x$ was unknown; however, the temperature driving force between the char surface and the nitrogen oxides from the bulk stream that had diffused into the char boundary layer was sufficient to cause chemical reactions (1) and (2) to easily proceed particularly with excess char.

EXAMPLE 2

To investigate chemical reaction (1), the experiment apparatus of Example 1 was employed. Ten gram pyrolytic carbon black was inserted into the reaction tube and a gas containing 550 ppm NO and 99.95% $N_2$ was introduced into the top of the reactor. When the RF field was energized to approximately 350 watts, measurements of the NO level reduced to essentially zero. When the RF field was turned off, the measurements quickly returned to the previous input concentration. A further test using variable RF wattage showed that the maximum reaction conditions appeared at about 550 watts.

EXAMPLE 3

To investigate the effect of oxygen on the conversion of NO, the apparatus of Example 1 was employed with 500 ppm of NO in nitrogen. Tests with oxygen content of 2.0, 3.4, and 5.0 percent were conducted where the flow of nitric oxide started about 14 minutes before any oxygen was introduced. The RF energy was constant at 550 watts. Without any oxygen present the NO concentration was essentially zero. Only in the 2 percent oxygen test did a measurable level of 40 ppm NO appear briefly before being reduced back to near zero. This experiment employed using pulsed or intermittent RF-energy in place of continuous application.

EXAMPLE 4

A similar test as Example 2 was performed with a inlet composition of 1500 ppm $SO_2$ and 99.85% $N_2$. The reaction kinetics for this chemical reaction (3) were not as fast, indicating a longer needed reaction residence time, yet the $SO_2$ concentration was lowered to approximately 100 ppm. In practice this longer residence time proved unimportant since the char was normally much in excess. Using variable RF wattage showed that the maximum reaction conditions appeared as before at approximately 550 watts.

EXAMPLE 5

A test involving $N_2O$ reactions, chemical reactions (5) and (6), proceeded similar to Example 2. About 25 grams of char from mild coal gasification processing was employed in a quartz tube reactor with a helium sweep gas. The $N_2O$ was introduced and made up 50 percent by volume of the flowing gas which measured two standard cubic feet per hour. After RF energy at 550 watts applied for 16 minutes the composition of the exit gas, measured with a Hewlett-Packard 5890 Series II gas chromatograph, on a helium free basis was: $N_2$: 56.4%; CO: 30.8%; $CO_2$: 12.8%. Apparently both chemical reactions (5) and (6) were occurring at nearly equal rates; however, importantly no $N_2O$ was detected in the reaction exit gas as there was total conversion of all nitrous oxide present.

EXAMPLE 6

A similar test as Example 2 was performed with a inlet composition of 5.24% $H_2S$ and 94.76% $N_2$ but with 20 gram virgin char containing about 13% ash that had considerable oxide components. Thus the overall reaction was a combination of reactions (3), (4), and (7) producing hydrogen, carbon dioxide and carbon monoxide as shown in Table 3. At about 120 minutes of reaction time, hydrogen sulfide began appearing in the product stream indicating that the oxide supply of the virgin char was being depleted of molecules containing oxygen that would react with $H_2S$ under these catalysis conditions.

Repeating this experiment using air in place of nitrogen produced a time for $H_2S$ breakthrough of only 40 minutes with much carbon monoxide formed. The implication is that the RF—char catalysis prefers the oxygen-carbon reaction to form carbon monoxide over the oxygen-sulfur reaction to the unstable intermediate sulfur dioxide. Thus for conversion of a substance like hydrogen sulfide with RF—char catalysis, the reactive form of the oxide is likely important.

EXAMPLE 7

An experiment similar to Example 6 was performed to remove $H_2S$ from a gas stream. The previous conclusion was that some additive containing bound oxygen, such as calcium oxide or the mineral trona, was employable with the char bed.

The mineral trona, a sesqui-carbonate of sodium having the formula $Na_2CO_3 \cdot NaHCO_3 \cdot 2H_2O$, appeared a desirable material. Using 20 grams of char well mixed with 1.5, 3.0, 6.0, and 12.0 grams of finely ground trona and applying RF resulted in $H_2S$ breakthrough times of 165, 210, 315, and 495 minutes respectively. The char only breakthrough time was 120 minutes. Thus the oxygen from the trona was catalyzed by the RF—char into reacting with the hydrogen sulfide. The reaction products were likely sodium sulfide, carbon dioxide and water.

Similar satisfactory results were obtained employing CaO as the oxygen source.

EXAMPLE 8

Exhaust gas from many sources have oxygen containing compounds. Power plants often have $SO_2$, $NO_x$, $N_2O$, or $O_2$. As noted in Example 1 RF—char catalyzes reactions with such compounds readily.

A special situation occurs with the exhaust from diesel engines such as were employed on large trucks, locomotives, and many fixed industrial engines. Such exhaust contained considerable soot, a carbon complex material resembling carbon black but containing other carbon compounds of a complex and varying nature. This soot was quite visible in the exhausts from such engines. Additionally besides soot this diesel exhaust contained $N_2$, NO or perhaps $NO_x$, $CO_2$ and $O_2$. A typical $O_2$ concentration was about 3-10 percent and represented enough oxygen to theoretically further burn out the soot content.

A preliminary experiment was performed using the setup of Example 3 with RF—char catalyzing NO and $O_2$ in a nitrogen carrier gas. The NO concentration was 500 ppm and the oxygen concentration was 2, 3.4, and 5 percent. Over a 100 minute period, essentially no NO occurred in the leaving carrier gas for the latter two oxygen concentrations. Some slight detection NO was observed for the 2 percent $O_2$ data. However once the RF field was shutoff, the NO concentration quickly recovered to the feed value.

Another experiment utilized a mixture more common to diesel exhaust. It contained 360 ppm NO, 6.0 percent $O_2$, and a small concentration of carbon soot in a $N_2$ carrier gas passing through a small two inch diameter wave-guide reactor with RF-energy applied at 2450 MHz and 900 watts. The exit stream measured less than approximately 5 ppm NO using a chemilumenizer. Upon turning off the RF field, the NO concentration quickly recovered to 360 ppm. If the residence time was sufficient, the exit gas was essentially soot and NO free. In this instance the soot was an equivalent of the char for this RF—char catalysis.

EXAMPLE 9

In another reaction example app. '380 showed a mixed group of nitriles and other organic molecules was converted with RF—char catalysis with an oxygen-free sweep gas; thus, oxygen containing products were catalyzed with internal oxygen.

The general term oxides or source of oxides means any substance that contains molecules comprising one or more oxygen atoms. Thus oxides can be a gas such as $SO_2$, $NO_x$, $N_2O$, or $O_2$. Here $NO_x$ includes NO and other more complex forms of nitrogen oxides commonly found in combustion products while the often non-combustion product $N_2O$ is listed separately. Further any molecule containing an oxygen atom that is in the vapor state is potentially such a gas, for instance, ketones, hydroxides, or other oxygen-containing chemical constituents.

In addition the oxide can be a solid or liquid finely mixed with the pyrolytic carbon, such as inorganic oxides, hydroxides, or acids like $CaO$, $Al_2O_3$, $Na_2O$, $Fe_2O_3$, $K_2O$, $MgO$, $NaOH$, $H_2SO_4$, $H_3PO_4$, and $HNO_3$. Oxygen-containing minerals such as trona, $Na_2CO_3 \cdot NaHCO_3 \cdot 2H_2O$, are a common and convenient source of oxides and usable with char when finely divided and mixed.

The least preferred are oxides of carbon such as carbon monoxide and carbon dioxide; yet carbonates are usable. Additionally water is a poor source of oxides since it becomes vaporized easily and does not remain in close proximity to the char surface; however, such use at high pressures is possible. the concept of close proximity to the char surface does not require molecular adsorption but only sufficient residence time in the char surface boundary layer to allow needed energy transfer to induce reaction catalysis; however, adsorption meets this criteria and is sometimes utilized prior to application of RF-energy.

In all instances combinations of oxides, or combinations of sources of oxides, are employable.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for the catalysis of conversion reactions comprising:
    employing pyrolytic carbon;
    bringing oxides in close proximity to said pyrolytic carbon; and
    applying radiofrequency energy.

2. The process according to claim 1 wherein said pyrolytic carbon further comprises being selected from carbon black, char, other elemental carbon containing substance, and combinations thereof.

3. The process according to claim 1 wherein said pyrolytic carbon further comprises being utilized in a form selected from a fixed bed, fluidized bed, moving bed, and combinations thereof.

4. The process according to claim 1 wherein said oxides further comprises being selected from $SO_2$, $NO_x$, $N_2O$, $O_2$, and combinations thereof.

5. The process according to claim 1 wherein said oxides further comprises being selected from oxygen-containing minerals, inorganic oxides, hydroxides, oxygen-containing acids, and combinations thereof.

6. The process according to claim 1 wherein said reaction further comprises maintaining a bulk temperature below about 300° F.

7. The process according to claim 1 wherein said radiofrequency energy further comprises being selected from a frequency range of about 915 to 5000 MHz, and combinations thereof, and being applied continuously, intermittently, and combinations thereof.

8. A process for cleanup of exhaust gas comprising:
    employing pyrolytic carbon;
    employing a source of oxides;
    mixing said pyrolytic carbon, said source of oxides and said exhaust gas; and
    applying radiofrequency energy.

9. The process according to claim 8 wherein said pyrolytic carbon further comprises soot which is a constituent of said exhaust gas.

10. The process according to claim 8 wherein said source of oxides further comprises being selected from $O_2$, $NO_x$, and combinations thereof, which are constituents of said exhaust gas.

11. The process according to claim 8 wherein said radiofrequency energy further comprises being selected from a frequency range of about 915 to 5000 MHz, and combinations thereof, and being applied continuously, intermittently, and combinations thereof.

* * * * *